United States Patent
Boudinot

(10) Patent No.: US 6,698,832 B2
(45) Date of Patent: Mar. 2, 2004

(54) VIDEO SCREEN INTEGRATED IN A HEAD REST

(75) Inventor: Richard Boudinot, Leverkusen (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/156,723

(22) Filed: May 28, 2002

(65) Prior Publication Data
US 2003/0025367 A1 Feb. 6, 2003

(51) Int. Cl.⁷ .................................................. A47C 31/00
(52) U.S. Cl. ...................... 297/217.4; 297/391; 297/408
(58) Field of Search ............................ 297/440.1, 397, 297/217.4, 217.3, 217.1, 408, 391

(56) References Cited

U.S. PATENT DOCUMENTS 3,019,050 A * 1/1962 Spielman
5,147,109 A * 9/1992 Jolly
5,267,775 A * 12/1993 Nguyen
5,507,556 A * 4/1996 Dixon
5,713,633 A * 2/1998 Lu
5,906,414 A * 5/1999 Rus
6,215,518 B1 * 4/2001 Watkins
6,250,967 B1 * 6/2001 Chu
6,394,551 B1 * 5/2002 Beukema

* cited by examiner

Primary Examiner—Milton Nelson, Jr.
(74) Attorney, Agent, or Firm—Foley & Lardner

(57) ABSTRACT

A vehicle seat with a head rest detachably fastenable at a backrest of the seat and with an integrated video screen, for which the head rest has a storing space. In order to obtain an improved possibility to mount the seat using simple constructive techniques and in order to allow a high security for the passengers of the vehicle in its mounted state, the video screen is fastened in the storing space in a form-locking and/or force-locking manner between the head rest and the backrest. In particular in a first embodiment the video screen is fastened on a support piece of the backrest, which is provided with sleeves for supporting rods of the head rest and with a plug-in contact for the video screen.

28 Claims, 4 Drawing Sheets

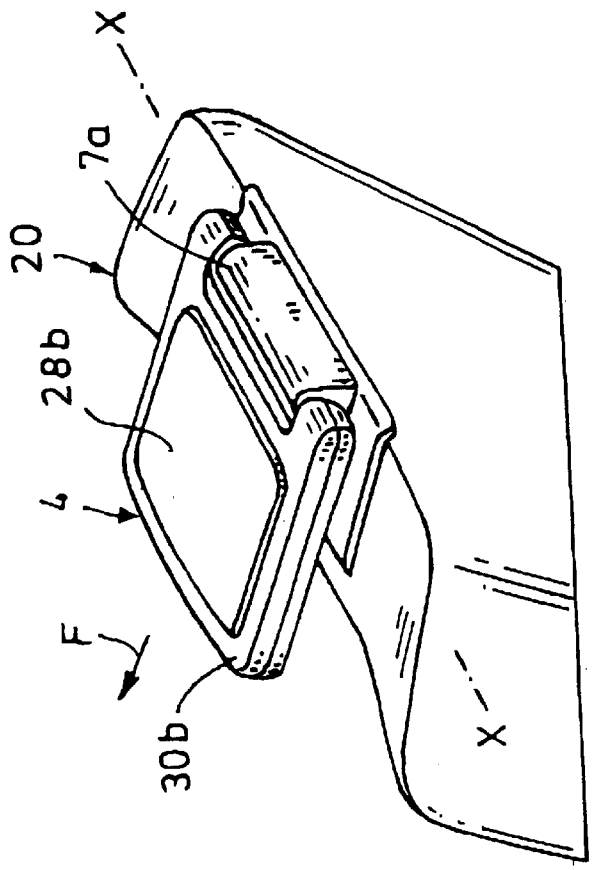
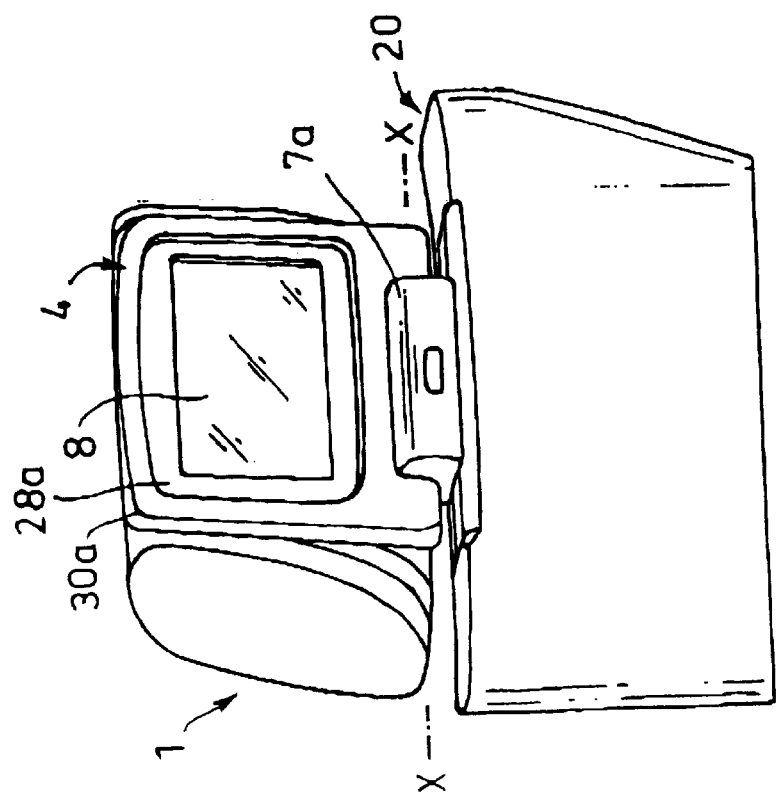

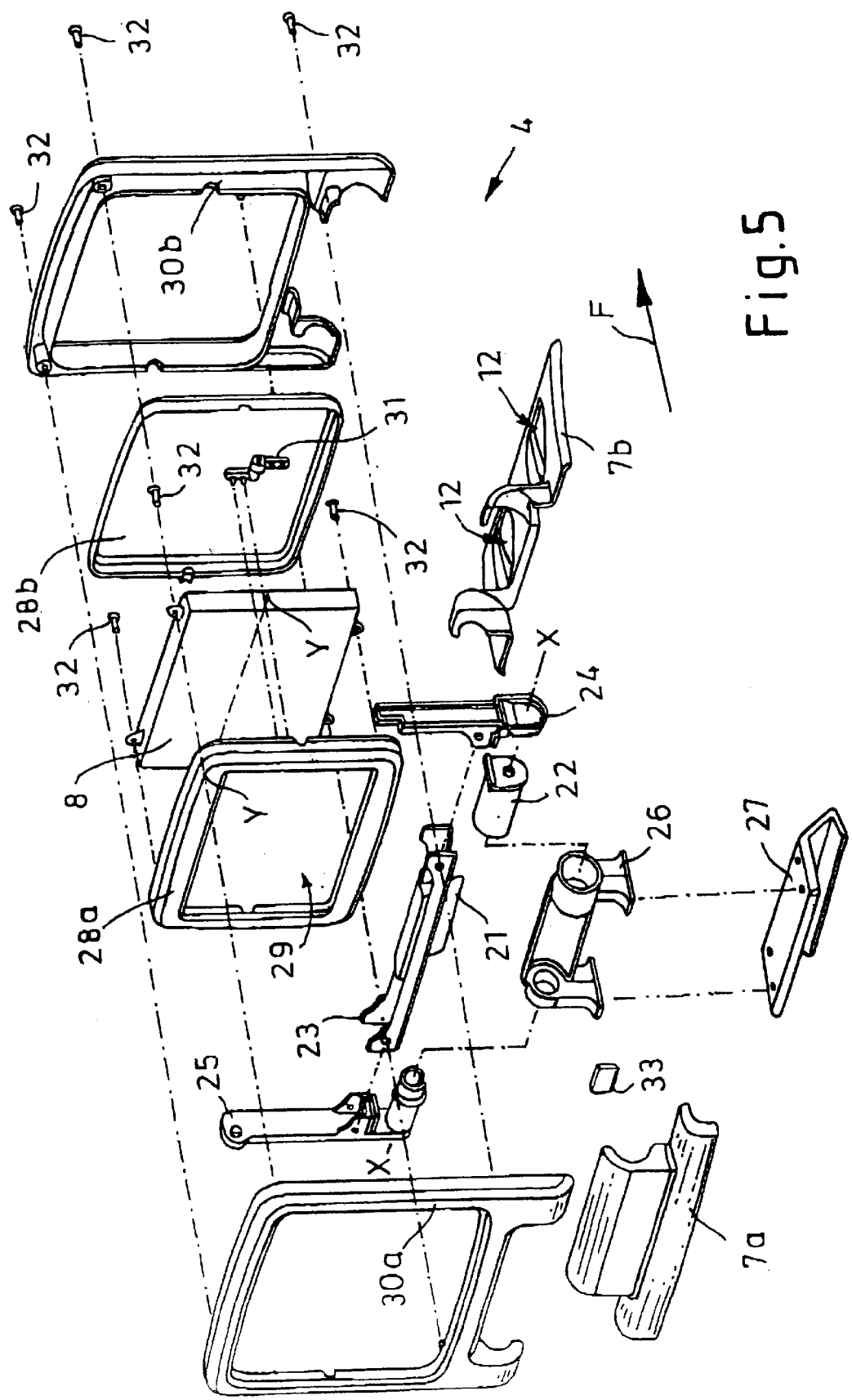

VIDEO SCREEN INTEGRATED IN A HEAD REST

The invention concerns a vehicle seat having a headrest detachably fastenable to a seatback, and having an integrated display screen device for which the headrest has a receiving space.

BACKGROUND OF THE DISCLOSURE

In order to offer passengers in a motor vehicle the ability to work or to entertain or inform themselves, it is known to install a display screen device in the region of the headrest of the seatback of a vehicle seat. The display screen device can be, for example, a TV receiver, a video device, or a computer.

Known vehicle seats that fulfill this purpose are described in German Utility Model Applications DE 295 18 369 U1 and DE 296 00 783 U11, and in U.S. Pat. No. 5,529,265. Utility Model DE 296 00 783 U1, for example, discloses a headrest for motor vehicles in which entertainment-sector devices can be integrated into a cavity. The vehicle seat having the headrest described is one of the type described initially.

In the case of the headrest for vehicle seats known from Utility Model DE 295 18 369 U1, there is arranged on the back side of the headrest a display screen that is integrated into a shaped element, removable from the headrest, having a space that is intended for reception of the headrest.

U.S. Pat. No. 5,529,265 describes a vehicle seat in which the integrated display screen device is mounted pivotably in a receiving space of the headrest, although the headrest is not fastened detachably to the seatback of the seat but rather forms a physical unit therewith.

It is the object of the invention to configure a vehicle seat having an integrated display screen device of the kind described initially, using means of simple design, so as to improve its ease of assembly while ensuring maximum comfort and a high level of safety for the vehicle's passengers.

The teachings hereinbelow extend to those embodiments which fall within the scope of the appended claims, regardless of whether they accomplish one or more of the above-mentioned needs.

SUMMARY OF EXEMPLARY EMBODIMENTS

This object is achieved by way of a vehicle seat of the kind cited initially in which in the assembled state, the display screen device is fastened in the receiving space positively and/or nonpositively between the headrest and the seatback.

The vehicle seat is thus, advantageously, very easy to assemble as a result of a modular construction of the headrest, display screen device, and seatback. The positive and/or nonpositive join, which in particular can be a clamped join, can be made sufficiently secure and, if necessary, can be reinforced in additionally securing fashion without thereby negatively affecting the ease of assembly.

This object is furthermore achieved by a vehicle seat of the kind described initially in which at least the display screen of the display screen device is pivotable about an axis extending in the transverse direction of the seat in the upper region of the seatback, and alternatively or additionally is rotatable about a (further) center axis extending in the transverse direction of the seat. The establishment of specific display screen positions thereby made possible allows the safety standard to be raised, and the comfort of the vehicle seat according to the present invention to be improved.

In motor vehicles, the headrest of a vehicle seat is generally guided in vertically displaceable fashion with two retaining rods in guide sleeves that are joined to the frame of the seatback of the vehicle seat. In a preferred embodiment of the invention, for detachable fastening of the display screen device an integral combination of the two guide sleeves, constituted by a bridge and serving as support part for the display screen device, can comprise a receiving opening which is configured in such a way that it can receive a commercially available plug connector for an electrical connection. The contacts of the plug connector can be allocated to supply lines necessary for operation of the display screen device. The entire cable bundle of the connector lines can thus advantageously, in a manner invisible to the passengers, be routed within the seatback and guided to the corresponding supply devices. The necessary electrical connection is then created simultaneously with placement of the display screen device onto the support part.

The display screen, which preferably can be embodied using LCD technology, can advantageously be arranged on an (in particular, flat) bottom part (console) that additionally comprises passthrough holes for passage of the retaining rods of the headrest. The result is to achieve an additional positive immobilization of the display screen device, which thus cannot be removed from its retaining apparatus without removing the headrest.

The receiving space of the headrest for the display screen device can advantageously be configured as a recess that is open on two sides (at the bottom and in the viewing direction of the viewer of the display screen device) and completely surrounds the display screen device, thus also yielding comprehensive impact protection for the passengers sitting in front of the display screen device. Sufficient passenger protection can be guaranteed even if the headrest must be adjusted vertically for purposes of adaptation.

Further advantageous embodiments of the invention are contained in the dependent claims and the following specific description.

BRIEF DESCRIPTION OF THE DRAWINGS

The invention will be explained in more detail with reference to two exemplary embodiments depicted in the appended drawings, in which:

FIGS. 3 and 4 depict, in perspective and in two different positions, the second embodiment of a vehicle seat according to an exemplary embodiment;

FIG. 5 is an exploded depiction, in perspective, of a display screen device of the second embodiment of a vehicle seat according to an exemplary embodiment.

In the various Figures of the drawings, identical parts are always labeled with the same reference characters so that as a rule, they are each also described only once.

DETAILED DESCRIPTION OF EXEMPLARY EMBODIMENTS

Figure 1:
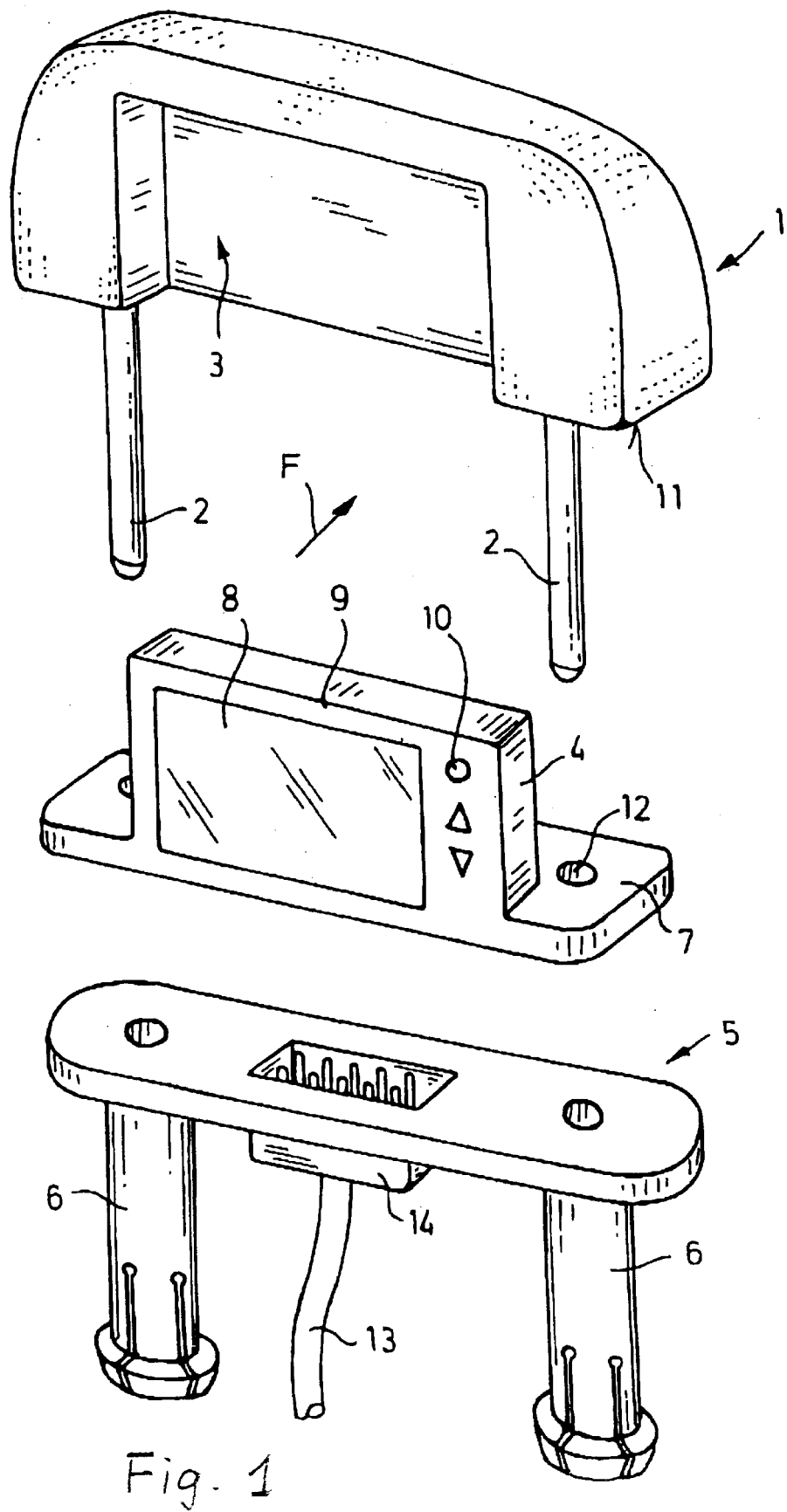
FIG. 1 is an exploded depiction, in perspective, of a first embodiment of a vehicle seat according to an exemplary embodiment.
Figure 2:
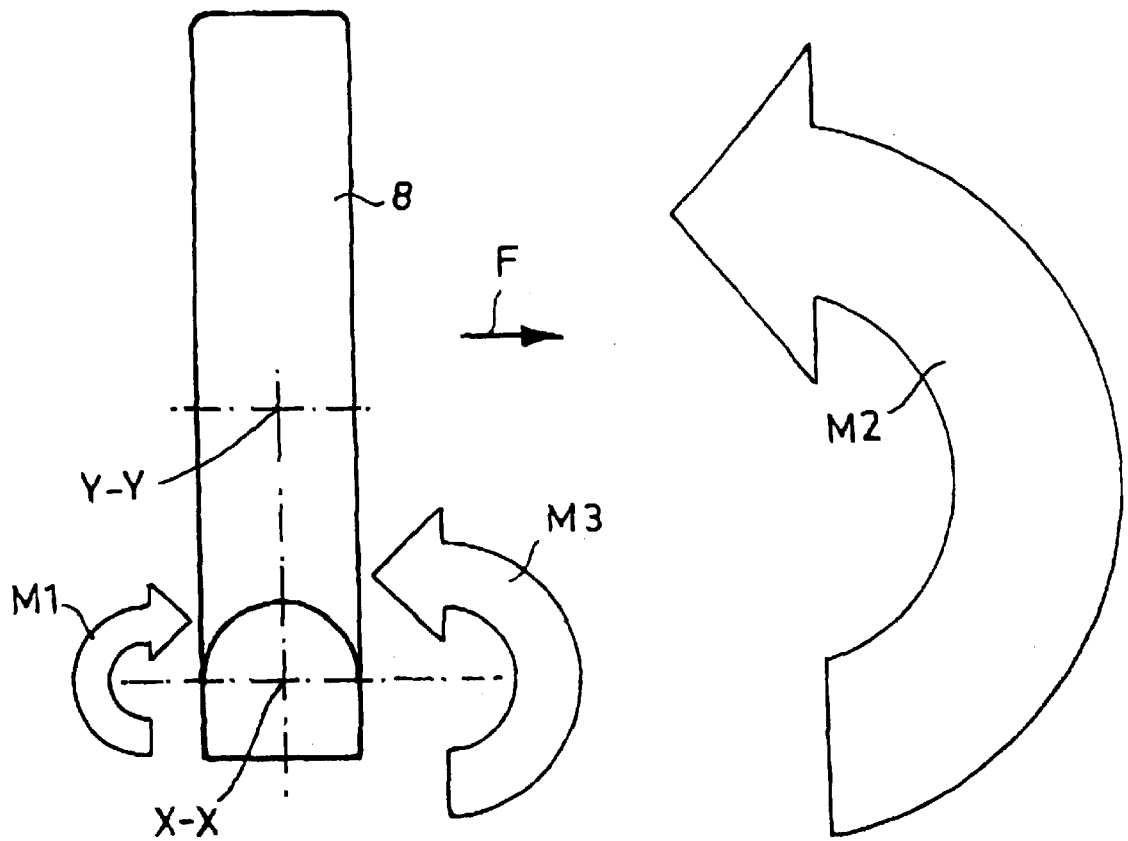
FIG. 2 is a schematic side view of a portion of a second embodiment of a vehicle seat according to an exemplary embodiment.

As is apparent firstly from the graphic depiction in FIG. 1 for the first embodiment but also from FIG. 3 for the second embodiment, a vehicle seat according to the present invention comprises a headrest 1 that is detachably fastenable to a seatback 20 (depicted in FIGS. 3 and 4). For that purpose, retaining rods 2 are fastened in known fashion to the underside of headrest 1.

Headrest 1 comprises a receiving space 3 for a display screen device 4 integrated into the vehicle seat according to the present invention. Upon assembly, this display screen device 4 can be fastened in clamping fashion (nonpositively) in receiving space 3 between headrest 1 and seatback 20. Receiving space 3 is advantageously constituted by a recess in headrest 1 that, in the assembled state, positively surrounds display screen device 4 and is open at the front (toward a viewer of display screen 4) and at the bottom (toward seatback 20).

In the embodiment depicted in FIG. 1, seatback 20 has associated with it a support part 5, arranged in an upper part of seatback 20, for display screen device 4. Fastening sleeves 6 for joining seatback 20 to headrest 1, through which retaining rods 2 of headrest 1 pass in the assembled state, are arranged in known fashion in seatback 20. Fastening sleeves 6 are joined in bridge fashion to one another by way of support part 5 for display screen device 4, or are configured integrally with support part 5. Support part 5 with sleeves 6 can advantageously be arranged in a depression of seatback 20 in such a way that it terminates flush with the upper side of seatback 20, e.g. with an upholstered surface of the back, or projects slightly thereabove.

Display screen device 4 comprises a flat bottom part 7 on which display screen 8 is arranged projecting vertically upward. The latter can, in known fashion, be surrounded by a housing 9 in which a suitable keypad 10 for operation of display screen device 4 is located. In an advantageous embodiment, display screen 8 can be a flat display screen, in particular an LCD screen.

For creation of an optimum nonpositive (clamping) connection of display screen device 4 between headrest 1 and seatback 20 of the seat according to the present invention, it is advantageous in this context if the base outline of bottom part 7 is larger than the base outline of display screen 8 (including the base outline of its housing 9), and preferably surrounds said base outline. It is additionally advantageous in this context if the base outline of bottom part 7 corresponds approximately to the base outline of support part 5 in the upper part of the seatback, and approximately to the base outline of a bottom surface 11 of headrest 1. As a result of this base outline configuration, headrest 1 is advantageously supported on bottom part 7, and bottom part 7 on support part 5, over a large area, contributing to optimum clamping.

In a particularly advantageous embodiment of the invention, as already mentioned, passthrough openings 12 for retaining rods 2 of headrest 1 can be arranged in bottom part 7, so that passage of retaining rods 2 through said openings 12 results in additional positive immobilization of display screen device 4. As a result, the clamping connection described above is additionally reinforced and reliability is increased, since display screen 4 can no longer be taken out of the vehicle seat without removing headrest 1.

With regard to the electrical connection or, for example, also the antenna connection of display screen device 4, a plug connector part 14 connected to connector lines 13, for electrical connection to a corresponding plug part (not depicted) of display screen 4 arranged in particular in the base of display screen device 4, can be integrated into support part 5 for display screen device 4. Connector lines 13 of plug connector part 14 can preferably be routed inside seatback 20.

The second embodiment of a vehicle seat according to the present invention illustrated by FIGS. 2 through 5 differs from the first embodiment especially in that at least display screen 8 of display screen device 4 is pivotable about an axis X—X extending in the transverse direction of the seat in the upper region of seatback 20.

Provision can be made in particular for display screen 8 to be pivotable backward, i.e. usually opposite to direction of travel F if the seat is installed correspondingly in the motor vehicle, upon application of a first torque. This is indicated by the arrow labeled M1 in FIG. 2. Torque M1 that is depicted is a resiliently acting return torque which counteracts the pivoting motion and brings the display screen back into its original position. Its magnitude can be small. This kind of pivotability of display screen 8 makes it possible, when headrest 1 has been removed, to bring seatback 20 of the motor vehicle seat according to the present invention into a horizontal position by folding it forward, while preventing display screen 8 from being damaged if it collides in the process with, for example, the dashboard or sun visor.

Provision can furthermore be made for display screen 8 to be pivotable up to 90 degrees forward, i.e. usually in direction of travel F, upon application of a second torque. This is indicated by the arrow labeled M2 in FIG. 2, which symbolizes the resistance to this pivoting motion. When the corresponding torque, which can be eight to ten times the magnitude of the first torque, is exceeded, the display screen folds down into a stable position. This pivotability of display screen 8 represents a misuse prevention feature. The deflecting pivoting of display screen 8, and optionally of further parts joined to it, in response to a large mechanical load prevents display screen 8 or other parts of display screen device 4 from breaking, for example if a passenger inadvertently leans on display screen 8 while exiting. The pivoted position assumed by display screen 8 with headrest 1 removed, which could also be called the "misuse position," is depicted in FIG. 4.

Lastly, provision can be made for display screen 8 to be slightly pivotable (less than 90 degrees) in direction of travel F, in particular upon application of a third torque in the context of the abrupt action of large acceleration forces, such as those that occur in the context of a rear-end impact on the vehicle. This is indicated by the arrow labeled M3 in FIG. 2, which illustrates a damping resistance torque opposite to the pivoting. The corresponding torque can preferably be greater than first torque M1 (e.g. twice as great), but less than second torque M2, as indicated by the differing sizes and thicknesses of the arrows in FIG. 2. This represents a safety feature in a crash situation.

In order to determine the motion sequence upon pivoting of display screen 8, in particular the forces or torques M1, M2, M3 that initiate and inhibit the pivoting motion, a device that preferably comprises at least one spring member and one damper member can be integrated into display screen device 4. In FIG. 5, for example, a spring 21 is provided as the spring member and a damper 22 as the damper member, located in the assembled state in corresponding associated housing parts, i.e. a spring housing part 23 and damper housing part 24. Spring 21 applies return torque M1, while damper 22 counteracts any pivoting of display screen 8, for example in the event of a crash, while applying torque M3. Spring housing part 23 and damper housing part 24 constitute, together with a farther housing part 25 that provides cable guidance, a frame part (not further labeled as a whole) for display screen 8 which is fastened via a base part 26 to an adapter 27 for connection to an upper part of seatback 20. The adapter could also, like part 5 depicted in FIG. 1, be referred to as the support part for display screen device 4.

Corresponding to the flat bottom part 7 of the first embodiment of the invention shown in FIG. 1, FIG. 5 shown the two bottom segments 7a, 7b, of which one (7b) comprises passthrough openings 12 for retaining rods 2 of headrest 1,. In the assembled state, bottom segments 7a, 7b surround base part 26 joined to adapter 27, and conceal adapter 27.

The aforementioned axis X—X extending in the transverse direction of the seat in the upper region of seatback 20, about which display screen 8 of display screen 4 is pivotable, is depicted in FIG. 5 as being offset because of the exploded depiction. In the installed state it extends in a straight line, beginning at a lower end of housing part 25 for cable guidance, continuing through base part 26 and damper 22, and ending in damper housing part 24.

In the installed state, spring housing part 23 is arranged parallel to pivot axis X—X; spring 21 arranged therein can preferably be embodied as a leaf spring and can engage into base part 26.

FIG. 5 furthermore shows that advantageously, at least one cover part, but preferably (as depicted) a front (in terms of direction of travel F) cover part 28b and a rear cover part 28a, can be fastenable to display screen 8 of display screen device 4. Cover parts 28a, 28b are configured in the manner of half shells so they can surround display screen 8. Rear cover part 28a comprises a window 29 through which display screen 8 is visible. Front cover part 28b does not possess a window, but instead protectively covers the back panel of the display screen in the installed state.

In the installed state, display screen 8 is arranged between the two cover parts 28a, 28b and held, together with said parts, in a preferably multi-part frame that corresponds to housing 9 of the first embodiment of the invention depicted in FIG. 1. This frame (not further labeled as a whole) encompasses a front (in terms of direction of travel F) frame part 30b and a rear frame part 30a.

A further special aspect of the second embodiment of the vehicle seat according to the present invention is the fact that display screen 8 (including its two cover parts 28a, 28b) is mounted rotatably about a further center axis Y—Y that extends in the transverse direction of the seat and, in particular, is contained in the frame. This makes it possible, before display screen 8 is optionally pivoted forward once headrest 1 has been removed, to bring display screen 8 with cover parts 28a, 28b into a protected position in which the originally front (windowless) cover part 28a faces away from direction of travel F and—after display screen 8 (inclusive of frame parts 30a, 30b) has been pivoted approximately 90 degrees—upward. This non-use position of display screen device 4 is depicted in FIG. 4.

The non-use position of display screen device 4 can be established even if there is no intention to fold down seatback 20. For example, starting from the use position depicted in FIG. 3, firstly headrest 1 can be removed, then display screen 8 with the two cover parts 28a, 28b can be rotated 180 degrees about center axis Y—Y extending in the transverse direction of the seat, and then the headrest can be put back in place, thus resulting once again in a position similar to that in FIG. 3, except that display screen 8 is protected by front cover part 28b.

The mounting of display screen 8 in frame parts 30a, 30b, which permits a rotation of up to 180 degrees, also advantageously makes it possible, in the use position of display screen device 4 depicted in FIG. 3, to perform an individual adaptation of display screen 8 to the needs of a viewer in the context of a smaller rotation angle, by the fact that an optimum viewing angle can be steplessly set by way of a corresponding rotation. To ensure that display screen 8 does not independently rotate forward or backward away from that angle during vehicle operation, a brake mechanism 31 can be provided for locking, as shown in FIG. 5.

In contrast to display screen 8 and its cover parts 28a, 28b, spring housing part 23, damper housing part 24, and housing part 25 that serves for cable guidance—which also (as already mentioned) constitute a frame part—are immovably (nonrotatably) joined to, in particular interposed between, front frame part 30b and rear frame part 30a. The manner in which assembly, for example fastening with screws 32, can be accomplished is illustrated in FIG. 5 by the unlabeled dot-dash lines.

The invention is not limited to the exemplary embodiments depicted, but instead also encompasses all embodiments of identical function within the meaning of the invention. In particular, for example, the conformation and dimensioning of the parts described may deviate from the embodiments depicted. Or, for example, the upper and lower sides of bottom part 7, headrest 1, and support part 5, depicted respectively as being flat, can be equipped with contours that correspond positively to one another, thereby preventing any mutual relative motion of said parts.

One skilled in the art may moreover provide further features for the technical configuration of a vehicle seat according to the present invention without leaving the context of the invention. For example, it is possible for an infrared remote control also to be provided for display screen device 4, as illustrated by infrared window 33 depicted in FIG. 5.

Instead of the bearing point of brake mechanism 31 depicted in FIG. 5, provision can also be made that display screen 8 could be mounted laterally (to the right and left of braking mechanism 31 that is depicted) in its frame by way of ball joints located in particular in rear cover part 28, and thus could be adapted to different viewing directions; in the context of a pivoting motion about a vertical axis also made possible thereby, one or the other of the two ball joints would need in each case to be snapped out.

In addition, the invention is not limited to the combination of features defined in the independent claims, but instead can also be defined by any other combination of specific features of all the globally disclosed individual features. This means that in principle, practically any individual feature of the independent claims can be omitted or replaced by at least one individual feature disclosed elsewhere in the Application. In this respect, claim 1 is to be understood as merely a first attempt to state an invention, and independent inventive significance is also assigned, as stated, to claims 15 and 24.

Priority application 201 19 410.4, filed Nov. 28, 2001, including the specification, drawings, claims and abstract, is incorporated herein by reference in its entirety.

Priority application 201 08 701.4, filed May 25, 2001, including the specification, drawings, claims and abstract, is incorporated herein by reference in its entirety.

LIST OF REFERENCE CHARACTERS

1 Headrest
2 Retaining rod of 1
3 Receiving space of 1 for 4
4 Display screen device 5 Support part for 4
6 Fastening sleeves for 2
7 Bottom part of 4
7a, 7b Bottom segments
8 Display screen of 4
9 Housing of 4
10 Keypad of 4
11 Bottom surface of 1
12 Passthrough openings for 2 in 7, 7b
13 Connector line
14 Plug connector part in 5
20 Seatback
21 Spring
22 Damper
23 Spring housing part
24 Damper housing part
25 Housing part for cable guidance
26 Base part
27 Adapter
28a Rear cover part for 8
28b Front cover part for 8
29 Window in 28a
30a Rear frame part
30b Front frame part
31 Brake mechanism
32 Screws
F Direction of travel
M1 Torque
M2 Torque
M3 Torque
X—X Pivot axis for 8
Y—Y Rotation axis for 8

"Priority application 201 19 410.4, filed Nov. 28, 2001, including the specification, drawings, claims and abstract, is incorporated herein by reference in its entirety.

Priority application 201 08 701.4, filed May 25, 2001, including the specification, drawings, claims and abstract, is incorporated herein by reference in its entirety."

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. Vehicle seat, comprising a back rest detachably fastened to a head rest and an integrated display device, the head rest having a retaining space for said display device, wherein the display device, when mounted, is fitted into the retaining space between the head rest and the back rest by at least one of contact connection, and force connection.

2. Vehicle seat according to claim 1, wherein the display device, when mounted, is fitted into the retaining space between the head rest and the back rest by contact connection.

3. Vehicle seat according to claim 1, wherein the display device, when mounted, is fitted into the retaining space between the head rest and the back rest by force connection.

4. Vehicle seat according to claim 1, wherein a display of the display device is formed as a flat display.

5. Vehicle seat according to claim 1, wherein the retaining space is provided as a recess within the head rest comprising the display device in close contact when mounted to a viewer of the display device as well as downwardly in direction of the back rest.

6. Vehicle seat according to claim 1, wherein at least one cover can be fixed onto a display of the display device.

7. Vehicle seat according to claim 1, further comprising mounting posts for connecting the head rest with the back rest which are fixed to a bottom surface of the head rest.

8. Vehicle seat according to claim 1, wherein fixing sleeves for connecting the back rest with the head rest are positioned in the back rest.

9. Vehicle seat according to claim 8, wherein a support portion for the display device forms a bridge between the fixing sleeves.

10. Vehicle seat according to claim 1, wherein the display device comprises at least one bottom portion from which a display is projecting in a perpendicular direction.

11. Vehicle seat according to claim 10, wherein a female connectors, connected to connecting lines for connection with a corresponding male connector of the display device disposed in the bottom portion of the display devices, is integrated into the backrest.

12. Vehicle seat according to claim 11, wherein the connecting lines of the female connector are disposed within the back rest.

13. Vehicle seat according to claim 10, wherein an outline of the bottom portion is larger than an outline of the display.

14. Vehicle seat according to claim 10, wherein the outline of the bottom portion substantially corresponds to an outline of support portion in the upper part of the back rest.

15. Vehicle seat according to claim 10, wherein the outline of the bottom portion substantially corresponds to the outline of a bottom surface of the head rest.

16. Vehicle seat according to claim 10, wherein passage apertures for one or more mounting post(s) of the head rest are positioned in the bottom portion.

17. Vehicle seat according to claim 1, wherein a support portion for the display device is positioned in the back rest.

18. Vehicle seat according to claim 17, wherein the display device comprises at least one bottom portion from which a display is projecting in a perpendicular direction.

19. Vehicle seat according to claim 18, wherein the display of the display device is formed as a flat display.

20. Vehicle seat according to claim 19, wherein the flat display is an LCD display.

21. Vehicle seat according to claim 18, wherein an outline of the bottom portion is larger than an outline of the display.

22. Vehicle seat according to claim 21, wherein the outline of the bottom portion is located beneath the entire outline of the display.

23. Vehicle seat according to claim 22, wherein the outline of the bottom portion substantially corresponds to an outline of a support portion in the upper part of the back rest.

24. Vehicle seat according to claim 23, wherein a female connector, connected to connecting lines for connection with a corresponding male connector of the display device, disposed in the bottom portion of the display device, is integrated into the back rest.

25. Vehicle seat according to claim 23, wherein the outline of the bottom portion substantially corresponds to the outline of a bottom surface of the head rest.

26. Vehicle seat according to claim 25, further comprising mounting posts for connecting the head rest with the back rest which are fixed to the bottom surface of the head rest.

27. Vehicle seat according to claim 26, wherein fixing sleeves for connecting the back rest with the head rest are positioned in the back rest.

28. Vehicle seat according to claim 27, wherein the support portion in the upper part of the back rest forms a bridge between the fixing sleeves.

* * * * *

UNITED STATES PATENT AND TRADEMARK OFFICE
CERTIFICATE OF CORRECTION

PATENT NO.      : 6,698,832 B2
DATED           : March 2, 2004
INVENTOR(S)     : Richard Boudinot It is certified that error appears in the above-identified patent and that said Letters Patent is hereby corrected as shown below:

<u>Column 8,</u>
Line 18, please replace "connectors" with -- connector --.
Line 20, please replace "devices" with -- device --.

Signed and Sealed this

Fifth Day of October, 2004

JON W. DUDAS
*Director of the United States Patent and Trademark Office*